US010462521B2

(12) United States Patent
Gudmundsson et al.

(10) Patent No.: US 10,462,521 B2
(45) Date of Patent: *Oct. 29, 2019

(54) GENERATING HIGHLIGHT VIDEOS IN AN ONLINE GAME FROM USER EXPRESSIONS (71) Applicant: Teatime Games, Inc., Palo Alto, CA (US)

(72) Inventors: Gunnar Holmsteinn Gudmundsson, Reykjavik (IS); Johann Thorvaldur Bergthorsson, Reykjavik (IS); Thorsteinn Baldur Fridriksson, Reykjavik (IS); Ymir Orn Finnbogason, Gardabaer (IS)

(73) Assignee: Teatime Games, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,705

(22) Filed: Feb. 19, 2019

(65) Prior Publication Data
US 2019/0253756 A1 Aug. 15, 2019

Related U.S. Application Data (63) Continuation of application No. 15/897,979, filed on Feb. 15, 2018, now Pat. No. 10,237,615.

(51) Int. Cl.
| *A63F 13/85* | (2014.01) |
| *H04N 21/442* | (2011.01) |
| *H04N 21/478* | (2011.01) |
| *H04N 21/433* | (2011.01) |
| *G06K 9/00* | (2006.01) |
| *H04L 29/06* | (2006.01) |
| *H04N 21/44* | (2011.01) |

(52) U.S. Cl.
CPC ... *H04N 21/44218* (2013.01); *G06K 9/00302* (2013.01); *G06K 9/00711* (2013.01); *H04L 67/38* (2013.01); *H04N 21/4334* (2013.01); *H04N 21/44008* (2013.01); *H04N 21/4781* (2013.01); *A63F 13/85* (2014.09); *H04L 67/42* (2013.01)

(58) Field of Classification Search
CPC ......... H04N 21/44218; H04N 21/4334; H04N 21/44008; H04N 21/4781; G06K 9/00302; G06K 9/00711; H04L 67/38; H04L 67/42; A63F 13/85
See application file for complete search history.

(56) References Cited

U.S. PATENT DOCUMENTS

| 7,154,510 B2 | 12/2006 | Simon |
| 10,237,615 B1 * | 3/2019 | Gudmundsson ............. H04N 21/44218 |
| 2009/0285456 A1 | 11/2009 | Moon |
| 2012/0120219 A1 | 5/2012 | Wang |

(Continued)

*Primary Examiner* — Corbett B Coburn
(74) *Attorney, Agent, or Firm* — Esplin & Associates, PC (57) ABSTRACT This disclosure relates to generating video edits. The video edits are highlight videos of gameplay of an online game. The video edits comprise of one or more video clips of the online game. A video clip includes a portion of a recording of the gameplay of the online game. From user emotional manifestations, events of interests, and/or other information of the online game, the portion of the recording of the online game to include in the video clip are determined. The user is presented with access to the video edits and/or previews to the video edits.

20 Claims, 5 Drawing Sheets (56) References Cited

U.S. PATENT DOCUMENTS

| | | |
|---|---|---|
| 2013/0280682 A1 | 10/2013 | Levine |
| 2013/0339433 A1 | 12/2013 | Li |
| 2013/0345840 A1 | 12/2013 | Lempel |
| 2015/0213331 A1 | 7/2015 | Peng |
| 2017/0001112 A1 | 1/2017 | Gilmore |
| 2017/0171614 A1 | 6/2017 | El Kaliouby |
| 2017/0228600 A1 | 8/2017 | Syed |
| 2017/0238859 A1 | 8/2017 | Sadowsky |
| 2017/0339338 A1 | 11/2017 | Gordon |
| 2018/0075876 A1* | 3/2018 | Chintalapoodi ... G06K 9/00315 |

* cited by examiner

GENERATING HIGHLIGHT VIDEOS IN AN ONLINE GAME FROM USER EXPRESSIONS

FIELD OF THE DISCLOSURE

The present disclosure relates to generating video edits. The video edits may be highlight videos of gameplay of an online game. The video edits may comprise of one or more video clips of the online game. The video clips may be selected based on events of interest and user emotional manifestations in the online game.

BACKGROUND

Capturing important moments of gameplay in an online game and sharing the important moments are increasing in popularity. Highlight videos may be created from the important moments of gameplay in the online game. The highlight videos are an efficient way to review the important moments of gameplay in the online game.

SUMMARY

One aspect of this disclosure relates to generating video edits. For example, the video edits may be highlight videos of gameplay of an online game. The video edits may comprise of one or more video clips of the online game. A video clip may include a portion of a recording of the gameplay of the online game and a video of a user participating in the online game. The online game may include the video of the user. The gameplay of the online game may include the video of the user. The video of the user may be a video chat between the user and another user participating in the online game. The online game may include game elements, a communication interface, and/or other components of the online game. The communication interface may allow the user to communicate with other users participating in the online game. From user emotional manifestations, events of interests, and/or other information of the online game, the portion of the recording of the online game to include in the video clip may be determined. The user emotional manifestations may be evidence of one or more emotions being experienced by the user during the gameplay of the online game. For example, the user cheering with a smile may be an example of a user emotional manifestation. The events of interest may be in-game events that occur during the gameplay of the online game. For example, the user scoring a point in the online game may be an example of an in-game event that occurs in during the gameplay of the online game. In some implementations, a first video clip may include a first user emotional manifestation that occurred during a first point in time during the gameplay of the online game. In some implementations, a second video clip may include the first user emotional manifestation that occurred during the first point in time during the gameplay of the online game and/or a first event of interest that occurred during a second point in time during the gameplay of the online game. The user may be presented with access to the video edits, including the first video clip, the second video clip, and/or other video clips, and/or previews to the video edits.

In some implementations, a system for generating video edits may include one or more servers, one or more client computing devices, one or more external resources, and/or other components. The one or more servers may be configured to communicate with the one or more client computing devices according to a client/server architecture. Users of the system may access the system via the client computing device(s). The server(s) may be configured to execute one or more computer program components. The computer program components may include one or more of a capture component, an identification component, a determination component, a generation component, a presentation component, and/or other components.

In some implementations, the capture component may be configured to record the online game, the gameplay of the online game, and/or other information. In some implementations, the capture component may be configured to record visual and/or audio content of the online game, the gameplay of the online game, and/or other information. The recording of the online game may include visual and/or audio content of the online game, including the game elements, the communication interface, and/or other components of the online game. The communication interface may include a live stream of the user participating in the online game, and/or other communication elements. The live stream of the user participating in the online game may include a real-time or near real-time video of the user participating in the online game, and/or other contents.

In some implementations, the identification component may be configured to make identifications from the online game, the recording of the gameplay of the online game, and/or from other information relating to the online game. In some implementations, the identification component may be configured to make identifications of the user emotional manifestations, the events of interest, and/or other information of the online game. In some implementations, the identification component may be configured to make identifications of the user emotional manifestations by identifying evidence of one or more emotions being experienced by the user during the gameplay of the online game. In some implementations, the identification component may determine when the user emotional manifestations occurred during the gameplay of the online game and/or the recording of the gameplay of the online game. In some implementations, the identification component may be configured to make identifications of the events of interest by identifying the in-game events that occurred in the gameplay of the online game. In some implementations, the identification component may determine when the events of interest occurred during the gameplay of the online game and/or the recording of the gameplay of the online game.

In some implementations, the determination component may be configured to determine a portion of the recording of the gameplay of the online game to include in one or more video clips of the video edits. In some implementations, the determination component may determine to include a portion of the recording including at least one of the user emotional manifestations in a video clip. For example, the determination component may determine to include a portion of the recording that includes a point in time the user emotional manifestations occurred in the video clip. In some implementations, the determination component may determine to include a portion of the recording including at least one of the events of interest in a video clip. In some implementations, the determination component may determine to include a portion of the recording including at least one of the user emotional manifestations and at least one of the events of interest in a video clip.

In some implementations, the determination component may be configured to determine an association between the user emotional manifestations and the events of interests, and/or other information. For example, the determination component may be configured to determine if an event of interest caused a user emotional manifestation. If the event of interest caused the user emotional manifestation, the event of interest may be associated with the user emotional manifestation.

In some implementations, the generation component may be configured to generate video edits and/or other content. The video edits may include one or more of the video clips, and/or other information. In some implementations, the generation component may be configured to generate a first video edit that may include all the video clips, including the first video clip, the second video clip, the third video clip, and/or other video clips. In some implementations, the generation component may be configured to generate a second video edit that may include some of the video clips.

In some implementations, the presentation component may be configured to present the video edits and/or other information. In some implementations, the presentation component may be configured to present the video edits and/or other information to the client computing device and/or other devices. In some implementations, the presentation component may transmit information that facilitates the presentation of the video edits through the client computing device. In some implementations, the presentation component may provide the client computing device with access to the video edits. The presentation component may provide the client computing device 104 with previews of the video edits.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
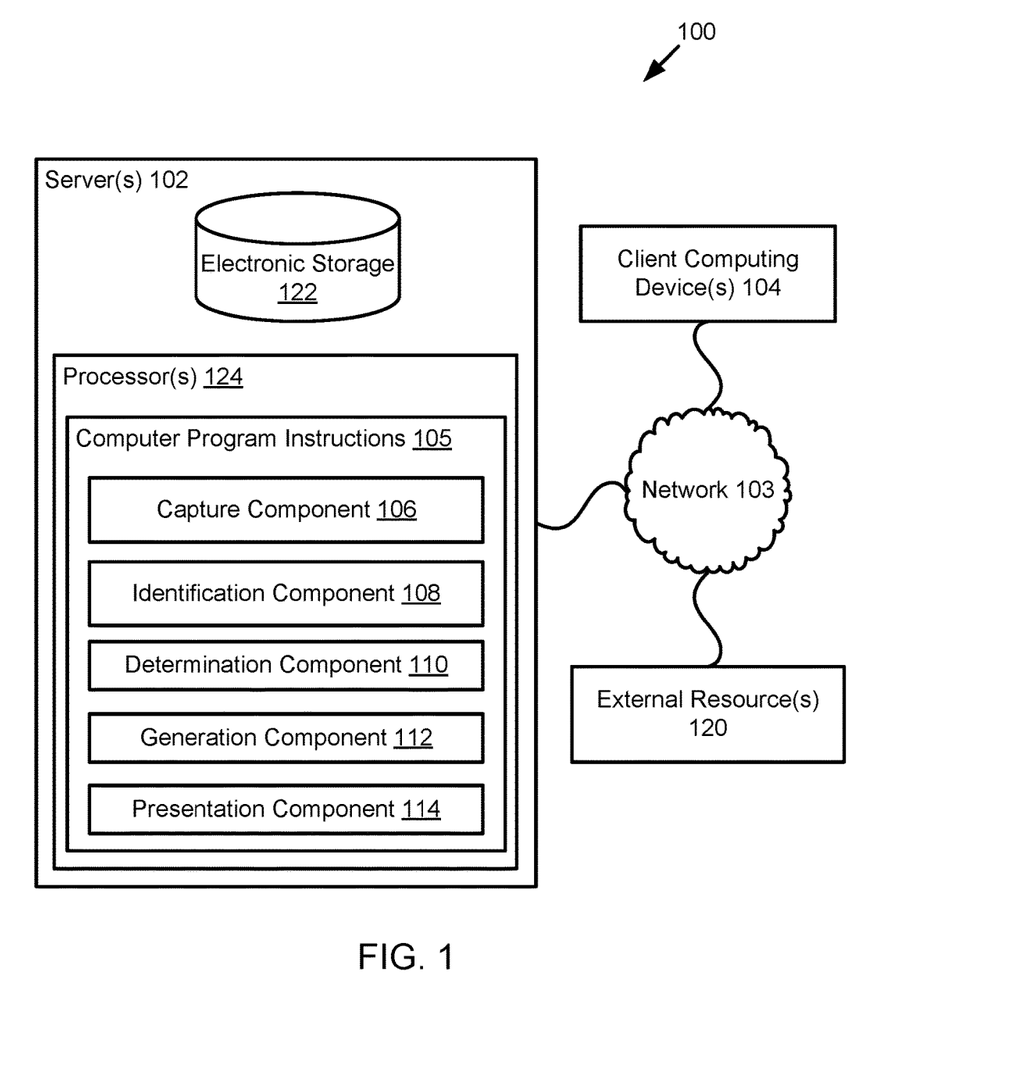
FIG. 1 illustrates a system for generating video edits, in accordance with one or more implementations.

FIG. 1 illustrates a system 100 for generating video edits. For example, the video edits may be highlight videos of gameplay of an online game. The video edits may comprise of one or more video clips of a recording of the online game. A video clip may include a portion of a recording of the gameplay of the online game and a video of a user participating in the online game. The online game may include the video of the user. The gameplay of the online game may include the video of the user. The video of the user may be a video chat between the user and another user participating in the online game. From user emotional manifestations, events of interest, and/or other information of the online game, the portion of the recording of the online game selected for the video clip may be determined. A user emotional manifestation may be evidence of one or more emotions experienced by the user during gameplay of the online game. An event of interest may be one or more in-game events that occurred during the gameplay of the online game. In some implementations, a first video clip may include a first user emotional manifestation that occurred during a first point in time during the gameplay of the online game. In some implementations, a second video clip may include the first user emotional manifestation that occurred during the first point in time during the gameplay of the online game and/or a first event of interest that occurred during a second point in time during the gameplay of the online game. The user may be presented with access to the video edits, including the first video clip, the second video clip, and/or other video clips, and/or previews to the video edits.

As illustrated in FIG. 1, system 100 may include one or more of one or more servers 102, one or more client computing devices 104, one or more external resources 120, and/or other components. Server(s) 102 may be configured to communicate with client computing device(s) 104 according to a client/server architecture. The user of system 100 may access system 100 via client computing device(s) 104. Server(s) 102 may include one or more physical processors 124, one or more electronic storages 122, and/or other components. The one or more physical processors 124 may be configured by machine-readable instructions 105. Executing machine-readable instructions 105 may cause server(s) 102 to generate video edits. Machine-readable instructions 105 may include one or more computer program components. The computer program components may include one or more of a capture component 106, an identification component 108, a determination component 110, a generation component 112, a presentation component 114, and/or other components.

In some implementations, electronic storage(s) 122 and/or other components may be configured to store recordings of the online game, portions of the recording of the online game, the video edits, the video clips, and/or other information. The recording of the online game may include visual and/or audio content of the online game, and/or other information.

In some implementations, client computing device(s) 104 may include one or more of a mobile computing device, a game console, a personal computer, and/or other computing platforms. The mobile computing device may include one or more of a smartphone, a smartwatch, a tablet, and/or other mobile computing devices. In some implementations, client computing device(s) 104 may carry one or more sensors. The one or more sensors may include one or more image sensors, one or more audio sensors, one or more infrared sensors, one or more depth sensors, and/or other sensors. In some implementations, the one or more sensors may be coupled to client computing device(s) 104.

In some implementations, an image sensor may be configured to generate output signals conveying visual information, and/or other information. The visual information may define visual content within a field of view of the image sensor and/or other content. The visual content may include depictions of real-world objects and/or surfaces. The visual content may be in the form of one or more of images, videos, and/or other visual information. The field of view of the image sensor may be a function of a position and an orientation of a client computing device. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices.

In some implementations, an audio sensor may be configured to generate output signals conveying audio information, and/or other information. The audio information may define audio from a user of the audio sensor (e.g., utterances of the user), audio around the user (such as ambient audio), and/or other information. In some implementations, an audio sensor may include one or more of a microphone, a micro-electro-mechanical microphone, and/or other devices.

In some implementations, a depth sensor may be configured to generate output signals conveying depth information within a field of view of the depth sensor, and/or other information. The depth information may define depths of real-world objects and/or surfaces, and/or other information. A field of view of the depth sensor may be a function of a position and an orientation of a client computing device. In some implementations, the depth information may define a three-dimensional depth map of real-world objects and/or a face of a user. In some implementations, the depth sensor may comprise of one or more ultrasound devices, infrared devices, light detection and ranging (LiDAR) devices, time-of-flight cameras, and/or other depth sensors and/or ranging devices. In some implementations, the infrared devices may include one or more infrared sensors. The infrared sensors may generate output signals conveying the depth information.

In some implementations, client computing device(s) 104 may include one or more of one or more processors configured by machine-readable instructions and/or other components. Machine-readable instructions of client computing device(s) 104 may include computer program components. The computer program components may be configured to enable the user associated with client computing device(s) 104 to interface with system 100, the one or more sensors, and/or external resources 120, and/or provide other functionality attributed herein to client computing device(s) 104 and/or server(s) 102.

In some implementations, capture component 106 may be configured to record the online game, the gameplay of the online game, and/or other information. In some implementations, the online game, the gameplay of the online game, and/or other information may be presented through a client interface of the client computing device(s) 104. The online game, the gameplay of the online game, and/or other information may be viewed by the user through the client interface. For example, the client interface may display visual content of the online game through a digital screen of the client computing device(s) 104. The client interface of the client computing device(s) 104 may include visual and/or audio content of the online game, the gameplay of the online game, and/or other information. In some implementations, capture component 106 may be configured to record the visual and/or audio content of the client interface of the client computing device(s) 104. In some implementations, capture component 106 may be configured to record the online game being played by the user through the client interface of client computing device(s) 104. In some implementations, the recording of the online game includes the video of the user. The video of the user may be of the video chat between the user and the other user participating in the online game.

In some implementations, the online game may include one or more game elements, a communication interface, and/or other components of the online game. In some implementations, capture component 106 may be configured to record visual and/or audio content of the online game, the gameplay of the online game, and/or other information. In some implementations, capture component 106 may be configured to record visual and/or audio content of the gameplay of the online game and/or other information. In some implementations, the visual and/or audio content of the gameplay of the online game may include the game elements, the communication interface, and/or other components of the online game. In some implementations, the visual and/or audio content of the gameplay of the online game may be stored in within electronic storage 122, non-transitory storage media, and/or other storage media.

In some implementations, capture component 106 may be configured to record the visual and/or audio content of the gameplay of the online game from a start to an end of the online game. In some implementations, the start of the online game may be when the user begins to interact with the online game. For example, the start of the online game may be the moment when the user opens the online game. In some implementations, the end of the online game may be when the user closes the online game. For example, the end of the online game may be the moment when the user leaves the online game. In some implementations, the start of the online game may be a beginning of a new phase of the online game. For example, the start of the online game may be a beginning of a match in the online game, and/or a beginning of a new instance in the online game. In some implementations, the end of the online game may be the ending of the new phase of the online game. For example, the end of the online game may be an ending of the match in the online game, and/or an ending of the new instance in the online game.

In some implementations, the game elements may include virtual content that makes up the online game, and/or other information. In some implementations, the game elements may include one or more game interfaces, game environments, virtual objects, virtual entities, and/or other virtual content. The virtual entities may include one or more non-player entities, player entities, and/or other entities. In some implementations, a player entity may be associated with the user. In some implementations, the user may control the player entity through client computing device(s) 104.

In some implementations, the user may interact with the online game. In some implementations, the user may interact with and/or control components of the online game. In some implementations, the user may interact with and/or control the game elements, and/or other components of the online game. For example, the user may interact with and/or control the virtual content that makes up the online game, and/or other components of the online game. In some implementations, the user may interact with and/or control the game elements through inputting user inputs through client computing device(s) 104, and/or through other inputs through other devices. The user input may comprise of one or more of a gesture input received through the image sensor and/or other sensors of the given client computing device(s) 104, one or more of a voice input received through the audio sensors of the given client computing device(s) 104, one or more of a touch input received though a touch-enabled display of the given client computing device(s) 104, one or more of a controller input received through game controllers of the given client computing device(s) 104 and/or other user inputs.

In some implementations, the communication interface may include communication between users participating in the online game, and/or other information. The communication interface may include communication between the user participating in the online game and another user participating in the online game. For example, the communication between the user and the other user may include one or more of an instant message, a voice chat, a video chat, and/or other forms of communication.

In some implementations, the communication between the user and the other user through the online game may include a live stream of the user and/or the other user participating in the online game. The live stream of the user and/or the other user participating in the online game may include a real-time or near real-time video of the user and/or the other user participating in the online game, and/or other content. In some implementations, the real-time or near real-time video of the user and/or the other user may include visual and/or audio content of the user and/or the other user.

In some implementations, the visual content of the user may include a face of the user, and/or other visual content. In some implementations, the visual content of the user may include facial features of the face of the user, and/or other visual content. In some implementations, the image sensor carried by client computing device(s) 104 may capture the visual content of the user. In some implementations, the output signals of the image sensor may convey visual information defining the visual content of the user.

In some implementations, the visual content of the other user may include a face of the other user, and/or other visual content. In some implementations, the visual content of the other user may include facial features of the face of the other user, and/or other visual content. In some implementations, the image sensors carried by another client computing device may capture the visual content of the other user. The other client computing device may have similar functionalities as client computing device(s) 104. In some implementations, output signals of an image sensor of the other client computing device may convey visual information defining the visual content of the other user.

In some implementations, the audio content may include audio information of the user (e.g., the user speaking) and/or other audio content. In some implementations, the audio sensors carried by client computing device(s) 104 may capture the audio content of the user. In some implementations, the output signals of the audio sensor carried by client computing device(s) 104 may convey audio information defining the audio content of the user.

In some implementations, the audio content may include audio information of the other user (e.g., the user speaking) and/or other audio content. In some implementations, an audio sensor carried by the other client computing device may capture the audio content of the other user. In some implementations, output signals of an audio sensor carried by the other client computing device may convey audio information defining the audio content of the other user.

In some implementations, identification component 108 may be configured to make identifications from the online game, the recording of the gameplay of the online game, and/or from other information relating to the online game. In some implementations, identification component 108 may be configured to make identifications of the user emotional manifestations, the events of interest, and/or other information from the online game. In some implementations, identification component 108 may be configured to make identifications of the user emotional manifestations, the events of interest, and/or other information from the recording of the gameplay of the online game, and/or from other information relating to the online game.

In some implementations, identification component 108 may be configured to make identifications of the user emotional manifestations, the events of interest, and/or other information of the online game concurrently with the gameplay of the online game, and/or during other time periods. In some implementations, identification component 108 may be configured to make identifications of the user emotional manifestations, the events of interest, and/or other information of the online game after the end of the gameplay of the online game, and/or during other time periods. In some implementations, identification component 108 may be configured to make identifications of the user emotional manifestations, the events of interest, and/or other information of the online game concurrently with the recording of the gameplay of the online game, and/or during other time periods. In some implementations, identification component 108 may be configured to make identifications of the user emotional manifestations, the events of interest, and/or other information of the online game from the recorded gameplay of the online game.

In some implementations, identification component 108 may be configured to make identifications of the user emotional manifestations, the events of interest, and/or other information of the online game through one or more machine learning techniques, image-processing techniques, computer vision techniques, and/or other techniques. The machine learning techniques may include one or more of a convolution neural network, decision tree learning, supervised learning, minimax algorithm, unsupervised learning, semi-supervised learning, reinforcement learning, deep learning, and/or other techniques. The image-processing techniques may include one or more of bundle adjustment, SURF, ORB, computer vision, and/or other techniques. The computer vision techniques may include one or more recognition techniques, motion analysis techniques, image restoration techniques, and/or other techniques.

In some implementations, identification component 108 may be configured to make identifications of the user emotional manifestations by identifying evidence of one or more emotions being experienced by the user during the gameplay of the online game. In some implementations, identification component 108 may identify the first user emotional manifestation, the second user emotional manifestation, and/or other user emotional manifestations. The one or more emotions being experienced by the user during the gameplay of the online game may include fear, anger, sadness, joy, disgust, surprised, trust, anticipation, and/or other emotions.

In some implementations, identification component 108 may be configured to identify the evidence of the one or more emotions being experienced by the user from the communication interface, and/or other content of the online game. In some implementations, identification component 108 may be configured to identify the evidence of the one or more emotions being experienced by the user from the communication interface during the gameplay of the online game. In some implementations, identification component 108 may be configured to identify the evidence of the one or more emotions being experienced by the user from the communication interface of the recording of the gameplay of the online game. In some implementations, identification component 108 may be configured to identify the evidence of the one or more emotions being experienced by the user from the visual and/or audio content of the communication interface during the gameplay of the online game. In some implementations, identification component 108 may be configured to identify the evidence of the one or more emotions being experienced by the user from the visual and/or audio content of the communication interface of the recording of the gameplay of the online game.

In some implementations, identification component 108 may be configured to identify the evidence of the one or more emotions being experienced by the user from the visual content of the communication interface. The visual content of the communication interface may include physical communication from the user. The physical communication from the user may be communication from the user via their body parts and/or face. For example, the physical communication may be a gesture and/or facial expression may be the user. The visual content of the communication interface may include the face of the user, gestures made by the user, and/or other information. The face of the user may include one or more facial expressions, and/or other information. In some implementations, facial features of the face may define the facial expressions, and/or other features of the face. In some implementations, the facial expressions of the face of the user may convey information about the emotions being experienced by the user. In some implementations, the gestures made by the user may convey information about the emotions being experienced by the user In some implementations, identification component 108 may identify the one or more emotions being experienced by the user from the facial expressions of the face of the user, and/or from other information. For example, if the facial expressions on the face of the user convey a smile, identification component 108 may identify evidence of joy being experienced by the user. If the facial expressions on the face of the user convey a frown, identification component 108 may identify evidence of anger or sadness being experienced by the user. In some implementations, identification component 108 may use the one or more machine learning techniques, the one or more image-processing technique, the one or more computer vision techniques, and/or techniques to identify the facial expressions of the user's face.

In some implementations, identification component 108 may determine the emotions associated with the facial expressions. The association between the emotions and the facial expressions may help identify the one or more emotions being experienced by the user, and/or other information. In some implementations, specific facial expressions may be associated with specific emotions. In some implementations, the association between the specific facial expressions and the specific emotions may be predetermined. For example, a smile may be associated with joy, a frown may be associated with anger or sadness, and/or other facial expressions may be associated with other emotions. In some implementations, identification component 108 may use the one or more machine learning techniques, the one or more image-processing technique, the one or more computer vision techniques, and/or techniques to determine the association between the specific facial expressions and the specific emotions.

In some implementations, identification component 108 may identify the one or more emotions being experienced from the gestures made by the user, and/or from other information. For example, if the gestures made by the user conveys a clap, identification component 108 may identify evidence of joy being experienced by the user. If the gestures made by the user conveys a hateful message, identification component 108 may identify evidence of anger being experienced by the user. In some implementations, identification component 108 may use the one or more machine learning techniques, the one or more image-processing technique, the one or more computer vision techniques, and/or techniques to identify the gestures made by the user.

In some implementations, identification component 108 may determine the emotions associated with the gestures made by the user. The association between the emotions and the gestures may help identify the one or more emotions being experienced by the user. In some implementations, specific gestures made by the user may be associated with specific emotions. In some implementations, the association between the specific gestures made by the user and the specific emotions may be predetermined. For example, a clap may be associated with joy, a hateful gesture may be associated with anger, and/or other gestures made by the user may be associated with other emotions. In some implementations, identification component 108 may use the one or more machine learning techniques, the one or more image-processing technique, the one or more computer vision techniques, and/or techniques to determine the association between the specific gestures made by the user and the specific emotions.

In some implementations, identification component 108 may be configured to identify the evidence of the one or more emotions being experienced by the user from a vocal communication from the user. The vocal communication from the user may be obtained from the communication interface. The vocal communication from the user may include audio content from the user. In some implementations, identification component 108 may be configured to identify the evidence of the one or more emotions being experienced by the user from the nature of the audio content from the user through the communication interface. The audio from the user may include one or more spoken words, tonality, speed, volume, and/or other information. In some implementations, the nature of the audio from the user may convey information about the emotions being experienced by the user.

In some implementations, identification component 108 may identify the one or more emotions being experienced by the user from the nature of the audio from the user, and/or from other information. For example, if the audio of the user conveys a laugh, identification component 108 may identify evidence of joy being experienced by the user. If the audio of the user conveys a shout, identification component 108 may identify evidence of anger being experienced by the user. If the audio of the user conveys profanity, identification component 108 may identify evidence of anger being experienced by the user. If the audio of the user conveys a sudden increase in volume, identification component 108 may identify evidence of surprise being experienced by the user. If the audio of the user conveys a sudden increase in speed, identification component 108 may identify evidence of anticipation being experienced by the user. In some implementations, identification component 108 may use the one or more machine learning techniques, and/or techniques to identify the nature of the audio from the user.

In some implementations, identification component 108 may determine the emotions associated with the nature of the audio from the user. The association between the emotions and the nature of the audio from the user may help identify the one or more emotions being experienced by the user. In some implementations, specific nature of the audio from the user may be associated with specific emotions. In some implementations, the association between the specific nature of the audio from the user and the specific emotions may be predetermined. For example, laughter may be associated with joy, shouting and/or profanity may be associated with anger, a sudden increase in volume may be associated with surprise, a sudden increase in speed may be associated with anticipation, and/or other nature of the audio from the user may be associated with other emotions. In some implementations, identification component 108 may use the one or more machine learning techniques, and/or techniques to determine the association between the specific nature of the audio from the user and the specific emotions.

In some implementations, identification component 108 may determine when the user emotional manifestations occurred during the gameplay of the online game and/or the recording of the gameplay of the online game. In some implementations, identification component 108 may determine points in time the user emotional manifestations occurred during the gameplay of the online game and/or the recording of the gameplay of the online game. In some implementations, identification component 108 may determine the individual points in time the first user emotional manifestation, the second user emotional manifestation, and/or other user emotional manifestations occurred during the gameplay of the online game and/or the recording of the gameplay of the online game.

In some implementations, the points in time the user emotional manifestations occurred in during the gameplay of the online game may be when the evidence of the one or more emotions being experienced by the user was identified during the gameplay of the online game. For example, if the first user emotional manifestation occurred 5 minutes (e.g., the first point in time) into the gameplay of the online game, identification component 108 may determine that the first point in time may be 5 minutes into the gameplay of the online game. If the second user emotional manifestation occurred 6 minutes into the gameplay of the online game, identification component 108 may determine that the second point in time may be 6 minutes (e.g., the second point in time) into the gameplay of the online game.

In some implementations, the points in time the user emotional manifestations occurred in the recording of the gameplay of the online game may be when the evidence of the one or more emotions being experienced by the user was identified during the recording of the gameplay of the online game. For example, if the first user emotional manifestation occurred 5 minutes into the recording of the gameplay of the online game, identification component 108 may determine that the first point in time may be 5 minutes into the recording of the gameplay of the online game. If the second user emotional manifestation occurred 6 minutes into the recording of the gameplay of the online game, identification component 108 may determine that the second point in time may be 6 minutes into the recording of the gameplay of the online game.

In some implementations, identification component 108 may be configured to make identifications of the events of interest by identifying the in-game events that occurred in the gameplay of the online game. In some implementations, identification component 108 may identify the first event of interest, the second event of interest, and/or other events of interest. The in-game events that occurred in the gameplay of the online game may be one or more actions, activities, events, and/or other occurrences during the gameplay of the online game.

In some implementations, identification component 108 may be configured to identify the in-game events from the game elements, and/or other information of the online game.

In some implementations, identification component 108 may be configured to identify the in-game events from the game elements during the gameplay of the online game, and/or other information of the online game. In some implementations, identification component 108 may be configured to identify the in-game events from the game elements of the recording of the gameplay of the online game, and/or other information of the online game. In some implementations, identification component 108 may be configured to identify the in-game events from the visual and/or audio content of the game elements during the gameplay of the online game. In some implementations, identification component 108 may be configured to identify the in-game events from the visual and/or audio content of the game elements of the recording of the gameplay of the online game.

In some implementations, the in-game events may include one or more changes in game state, criteria being met, temporal occurrences, interactions within the online game, and/or other in-game events. In some implementations, identification component 108 may be configured to identify one or more of the changes in game state, the criteria being met, the temporal occurrences, the interactions within the online game, and/or other in-game events. In some implementations, identification component 108 may be configured to identify one or more of the changes in game state, the criteria being met, the temporal occurrences, the interactions within the online game, and/or other in-game events through the one or more machine learning techniques, the one or more image-processing technique, the one or more computer vision techniques, and/or techniques.

In some implementations, identification component 108 may identify the events of interest from the one or more changes in game state, and/or other information. The one or more changes in game state may signify a change in a phase of the online game, a change in a stage of the online game, and/or other information. For example, the one or more changes in game state may include one or more of a start of the online game, an end of the online game, a pause in the online game, a start of a match in the online game, the end of a match in the online game, a change in the game environment, progression in the online game, and/or other changes in game states.

In some implementations, the change in the game environment may include one or more changes in the environment of the online game. For example, the change in the game environment may include a change in the weather system in the online game, a change in the game board of the online game, a change in the theme of the online game, and/or other changes of the game environment. In some implementations, the progression in the online game may include one or more of a virtual entity of the online game advancing in a portion of the virtual entity (e.g. leveling up), the virtual entity obtaining an item in the online game, the virtual entity obtaining a reward in the online game, the user finishing a portion of the online game, the user advancing to another portion of the online game, and/or other progression in the online game.

In some implementations, identification component 108 may identify the events of interest from the one or more criteria being met, and/or other information. The one or more criteria may define one or more objectives in the online game, one or more conditional events in the online game, and/or other information. For example, the one or more criteria may include an objective to reach a checkpoint, an objective to reach a milestone, an objective to reach, a condition for the user to win the online game, a condition for the user to lose the online game, a condition for the user to not winning in the online game (e.g., a draw), and/or other criteria. In some implementations, the one or more criteria being met may trigger other in-game events. For example, when the objective to reach a milestone is met, the game state may change, and the user may advance to another portion of the online game. When the condition for the user to lose the online game is met, the game state may change, and the online game may end.

In some implementations, identification component 108 may identify the events of interest from the one or more temporal occurrences, and/or other information. The one or more temporal occurrences may define one or more timed events. For example, the one or more temporal occurrences may include one or more timers running out in the online game, reaching time limits in the online game, reaching a time durations in the online game, and/or other temporal occurrences. In some implementations, the timers running out in the online game may include a timer running out for a match in the online game, a timer running out for a game session in the online game, a timer running out for some features of the online game, and/or other timer running out in the online game. The timer running out for some features of the online game may include the timer running out for an ability of the virtual entity of the online game, and/or other features.

In some implementations, identification component 108 may identify the events of interest from the one or more interactions within the online game, and/or other information. The one or more interactions within the online game may include the interaction between the users participating in the online game, an interaction between the users participating in the online game and the virtual content, an interaction between the virtual entities in the online game, an interaction between the virtual entities and the virtual objects in the online game, an interaction between the virtual entities and the virtual environment in the online game, and/or other interactions.

For example, the interaction between the users participating in the online game may include communication between the users participating in the online game through the communication interface, and/or other interfaces. The interaction between the users participating in the online game and the virtual content may include communication between the users and the virtual content, and/or other interactions. The interaction between the virtual entities in the online game may include communication between the virtual entities, contact between the virtual entities, and/or other interactions between the virtual entities. The interaction between the virtual entities and the virtual objects in the online game may include communication between the virtual entities and the virtual objects, contact between the virtual entities and the virtual objects, and/or other interaction. The interaction between the virtual entities and the virtual environment in the online game may include the virtual entities traversing across or to a particular portion of the virtual environment, and/or other interactions.

In some implementations, identification component 108 may determine when the events of interest occurred during the gameplay of the online game and/or the recording of the gameplay of the online game. In some implementations, identification component 108 may determine the points in time the events of interest occurred during the gameplay of the online game and/or the recording of the gameplay of the online game. In some implementations, identification component 108 may determine the individual points in time the first event of interest, the second event of interest, and/or other events of interest occurred during the gameplay of the online game and/or the recording of the gameplay of the online game.

In some implementations, the points in time the events of interest occurred during the gameplay of the online game may be when the in-game events were identified during the gameplay of the online game. For example, if the first event of interest occurred 3 minutes (e.g., the third point in time) into the recording of the gameplay of the online game, identification component 108 may determine that the third point in time may be 3 minutes into the recording of the gameplay of the online game. If the second event of interest occurred 4 minutes (e.g., the fourth point in time) into the recording of the gameplay of the online game, identification component 108 may determine that the fourth point in time may be 4 minutes into the recording of the gameplay of the online game.

In some implementations, the points in time the events of interest occurred in the recording of the gameplay of the online game may be when the in-game events were identified in the recording of the gameplay of the online game. For example, if the first event of interest occurred 3 minutes into the recording of the gameplay of the online game, identification component 108 may determine that the third point in time may be 3 minutes into the recording of the gameplay of the online game. If the second event of interest occurred 4 minutes into the recording of the gameplay of the online game, identification component 108 may determine that the fourth point in time may be 4 minutes into the recording of the gameplay of the online game.

In some implementations, determination component 110 may be configured to determine a portion of the recording of the gameplay of the online game to include in one or more video clips of the video edits. In some implementations, determination component 110 may be configured to generate the one or more video clips of the video edits based on the determination made for the portion of the recording of the gameplay of the online game to include in one or more video clips. The recording of the gameplay of the online game may hereby be referred to as: "the recording." In some implementations, determination component 110 may determine to include a portion of the recording including at least one of the user emotional manifestations in a video clip. In some implementations, determination component 110 may determine to include a portion of the recording including at least one of the events of interest in a video clip. In some implementations, determination component 110 may determine to include a portion of the recording including at least one of the user emotional manifestations and at least one of the events of interest in a video clip.

In some implementations, determination component 110 may be configured to determine a portion of the recording to include in a first video clip, a second video clip, a third video clip, and/or other video clips. The first video clip, the second video clip, and the third video clip may include different portions of the recording of the online game. For example, the first video clip may be the portion of the recording including at least one of the user emotional manifestations. The second video clip may be the portion of the recording including the portion of the recording including at least one of the events of interest. The third video clip may be the portion of the recording including the portion of the recording including at least one of the user emotional manifestations and at least one of the events of interest.

In some implementations, the portion of the recording including the user emotional manifestation may be a portion of the recording when the user emotional manifestations occurred. In some implementations, determination component 110 may determine to include the portion of the recording, including at least one point in time, the user emotional manifestations occurred in the video clip. In some implementations, if the first user emotional manifestation occurred at the first point in time (e.g., 5 minutes into the recording), determination component 110 may determine to include the portion of the recording including the first point in time of the recording. For example, the portion of the recording including the first point in time of the recording may include the recording between 4.5 minutes to 5.5 minutes. The duration of the portion of the recording to include in the video clip may be dependent on an expected duration of the first user emotional manifestation. Determination component 110 may determine the expected duration of the first user emotional manifestation through one or more machine-learning techniques.

In some implementations, determination component 110 may determine to include a portion of the recording, including more than one point in time, the user emotional manifestations occurred in the video clip. In some implementations, if the first user emotional manifestation occurred at the first point in time (e.g., 5 minutes into the recording) and the second user emotional manifestation occurred at the second point in time (e.g., 6 minutes into the recording of the gameplay of the online game), determination component 110 may determine to include the portion of the recording including the first point in time and the second point in time of the recording. For example, the portion of the recording including the first point in time and the second point in time of the recording may include the recording between 4.5 minutes to 6.5 minutes. The duration of the portion of the recording to include in the video clip may be dependent on an expected duration of the first user emotional manifestation and the second user emotional manifestation. Determination component 110 may determine the expected duration of the first user emotional manifestation and the second user emotional manifestation through one or more machine-learning techniques.

In some implementations, the portion of the recording including the events of interest may be a portion of the recording when the events of interest occurred. In some implementations, determination component 110 may determine to include the portion of the recording, including at least one point in time, the events of interest occurred in the video clip. In some implementations, if the first event of interest occurred at the third point in time (e.g., 3 minutes into the recording), determination component 110 may determine to include the portion of the recording including the third point in time of the recording. For example, the portion of the recording including the third point in time of the recording may include the recording between 2.5 minutes to 3.5 minutes. The duration of the portion of the recording to include in the video clip may be dependent on an expected duration of the first event of interest. Determination component 110 may determine the expected duration of the first event of interest through one or more machine-learning techniques.

In some implementations, determination component 110 may determine to include a portion of the recording, including more than one point in time, the events of interest occurred in the video clip. In some implementations, if the first event of interest occurred at the third point in time (e.g. 3 minutes into the recording) and the second event of interest occurred at the fourth point in time (e.g. 4 minutes into the recording), determination component 110 may determine to include the portion of the recording including the third point in time and the fourth point in time of the recording. For example, the portion of the recording including the third point in time and the fourth point in time of the recording may include the recording between 2.5 minutes to 4.5 minutes. The duration of the portion of the recording to include in the video clip may be dependent on an expected duration of the first event of interest and the second event of interest. Determination component 110 may determine the expected duration of the first event of interest and the second event of interest through one or more machine-learning techniques.

In some implementations, the portion of the recording including the user emotional manifestation and the events of interest may be a portion of the recording when the user emotional manifestations and the events of interest occurred. In some implementations, determination component 110 may determine to include the portion of the recording including at least one point in time the user emotional manifestations and at least one point in time the events of interest occurred in the video clip. In some implementations, if the first user emotional manifestation occurred at the first point in time (e.g., 5 minutes into the recording) and the first event of interest occurred at the third point in time (e.g. 3 minutes into the recording), determination component 110 may determine to include the portion of the recording including the third point in time and the first point in time of the recording. For example, the portion of the recording including the third point in time and the first point in time of the recording may include the recording between 2.5 minutes to 5.5 minutes. The duration of the portion of the recording to include in the video clip may be dependent on an expected duration of the first user emotional manifestation and the first event of interest. Determination component 110 may determine the expected duration of the first user emotional manifestation and the first event of interest through one or more machine-learning techniques.

In some implementations, determination component 110 may determine to include a portion of the recording including more than one point in time the user emotional manifestations and more than one point in time the events of interest occurred in the video clip. In some implementations, if the first user emotional manifestation occurred at the first point in time, the second user emotional manifestation occurred at the second point in time, the first event of interest occurred at the third point in time, and the second event of interest occurred at the fourth point in time, determination component 110 may determine to include the portion of the recording including the third point in time, the fourth point in time, the first point in time, the second point in time of the recording. For example, the portion of the recording including the third point in time, the fourth point in time, the first point in time, the second point in time of the recording may include the recording between 2.5 minutes to 6.5 minutes. The duration of the portion of the recording to include in the video clip may be dependent on an expected duration of the first user emotional manifestation, the second user emotional manifestation, the first event of interest, and the second event of interest. Determination component 110 may determine the expected duration through one or more machine-learning techniques.

In some implementations, determination component 110 may determine to include a portion of the recording including more than one point in time the user emotional manifestations and at least one point in time the events of interest occurred in the video clip. In some implementations, determination component 110 may determine to include the portion of the recording including at least one point in time the user emotional manifestations and more than one point in time the events of interest occurred in the video clip. In some implementations, the user may determine the number of the user emotional manifestations and/or the events of interest to include in the video clip. In some implementations, the number of the user emotional manifestations and/or the events of interest to include in the video clip may be predetermined by server(s) 102 or the online game.

In some implementations, determination component 110 may be configured to determine an association between the user emotional manifestations and the events of interests, and/or other information. For example, determination component 110 may be configured to determine if an event of interest caused a user emotional manifestation. If the event of interest caused the user emotional manifestation, the event of interest may be associated with the user emotional manifestation. In some implementations, determination component 110 determines the association between the user emotional manifestations and the events of interests based on the temporal relationship between the user emotional manifestations and the events of interest. For example, if a user emotional manifestation occurred shortly after an event of interest, determination component 110 may determine that the user emotional manifestation may be associated with the event of interest. In some implementations, determination component 110 determines the association between the user emotional manifestations and the events of interests using the one or more machine-learning techniques, and/or other techniques.

In some implementations, determination component 110 may determine to include a portion of the recording including the event of interest and the user emotional manifestation associated with the user emotional manifestation. In some implementations, determination component 110 may determine to include the portion of the recording including the points in time the event of interest and the user emotional manifestation associated with the user emotional manifestation occurred.

In some implementations, generation component 112 may be configured to generate video edits and/or other content. The video edits may include one or more of the video clips, and/or other information. The video edits may include one or more of the video clips generated by determination component 110, and/or other information. In some implementations, generation component 112 may be configured to generate a first video edit that may include all the video clips, including the first video clip, the second video clip, the third video clip, and/or other video clips. In some implementations, generation component 112 may be configured to generate a second video edit that may include some of the video clips.

In some implementations, generation component 112 may determine the one or more video clips to include in a video edit. In some implementations, generation component 112 may determine to include one or more video clips with content from a period of the recording. The period of the recording may be predetermined or determined by the user. The period of the recording may be predetermined or determined by the server(s) 102 or the online game. For example, generation component 112 may determine to include the one or more video clips with content from the recording between the start of the recording and the middle of the recording. Generation component 112 may determine to include the one or more video clips with content from the recording between the start of the recording and the end of the recording. In some implementations, generation component 112 may determine to include the one or more video clips with similar user emotional manifestations, events of interest, time durations, a combination of different user emotional manifestations, a combination of different events of interest, a combination of similar user emotional manifestations and events of interest, and/or other combination of video clips in the video edits.

In some implementations, the one or more video clips with the similar user emotional manifestations may be the one or more video clips where similar emotions are being experienced by the user in the one or more video clips. In some implementations, the video edit may include more than one of the video clips where similar emotions are being experienced by the user. In some implementations, the one or more video clips with the similar events of interest may be the one or more video clips with similar in-game events that occurred. In some implementations, the video edit may include more than one of the video clips where similar in-game events occurred.

In some implementations, presentation component 114 may be configured to present the video edits and/or other information. In some implementations, presentation component 114 may be configured to present the video edits and/or other information to client computing device(s) 104 and/or other devices. In some implementations, presentation component 114 may be configured to present a first video edit, a second video edit, and/or other video edits to client computing device(s) 104 and/or other devices. In some implementations, presentation component 114 may transmit information that facilitates the presentation of the video edits through client computing device(s) 104. In some implementations, presentation component 114 may provide client computing device(s) 104 with access to the video edits. Presentation component 114 may provide client computing device(s) 104 with previews of the video edits. The previews of the video edits may include a preview of the individual video clips of the video edits. The user of client computing device(s) 104 may have access to the video edits through client computing device(s) 104. The user of client computing device(s) 104 may preview the video edits through client computing device(s) 104. In some implementations, the user may access the video edits through one or more user inputs through client computing device(s) 104.

In some implementations, access to the video edits may include access to the individual video clips of the video edits. Access to the individual video clips of the video edits may include access to the visual and/or audio content of the video clip. In some implementations, the user may view the video edits through client computing device(s) 104. In some implementations, the user may view the individual video clips of the video edits through client computing device(s) 104. In some implementations, the user may modify the video edits and/or the individual video clips of the video edits through client computing device(s) 104. The video edits and/or the individual video clips of the video edits modified by the user through client computing device(s) 104 may be stored in client computing device(s) 104 and/or other storage media.

In some implementations, presentation component 114 may be configured to transmit the video edits or the individual video clips of the video edits to a different device. The user may instruct presentation component 114 to transmit the video edits or the individual video clips of the video edits to a different device through client computing device(s) 104. For example, the user may instruct presentation component 114 through client computing device(s) 104 to save the video edits or the individual video clips of the video edits to an external storage media or to client computing device(s) 104.

In some implementations, presentation component 114 may be configured to transmit the video edits or the individual video clips of the video edits to one or more external sources, and/or other devices. The external sources may be one or more of a social media, a video-sharing media, and/or other external sources. In some implementations, the user may instruct presentation component 114 to transmit the video edits or the individual video clips of the video edits to one or more external sources through client computing device(s) 104. For example, the user may instruct presentation component 114 through client computing device(s) 104 to transmit the individual video clips of the video edits to a social media account associated with the user.

In some implementations, server(s) 102, client device(s) 104, and/or external resources 120 may be operatively linked via one or more electronic communication links. For example, such electronic communication links may be established, at least in part, via the network 103 such as the Internet and/or other networks. It will be appreciated that this is not intended to be limiting and that the scope of this disclosure includes implementations in which server(s) 102, client device(s) 104, and/or external resources 120 may be operatively linked via some other communication media.

In some implementations, external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

In some implementations, Server(s) 102 may include electronic storage 122, one or more processors 124, and/or other components. Server(s) 102 may include communication lines or ports to enable the exchange of information with a network and/or other computing devices. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage 122 may include electronic storage media that electronically stores information. The electronic storage media of electronic storage 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing device(s) 104, and/or other information that enables server(s) 102 to function as described herein.

In some implementations, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same client computing device, or processor(s) 124 may represent processing functionality of a plurality of devices operating in coordination. The processor(s) 124 may be configured to execute computer-readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 2:
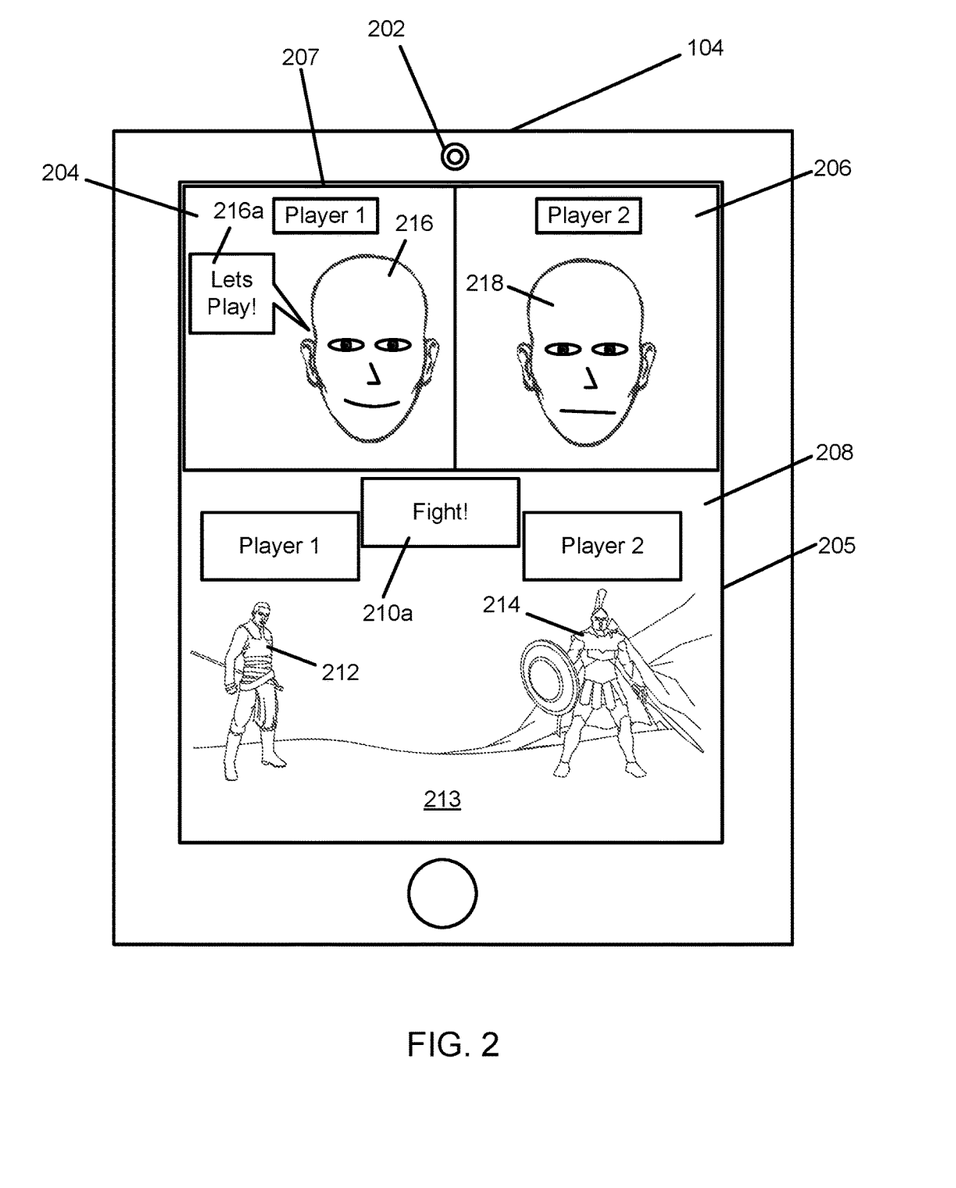
FIG. 2 illustrates a client computing device playing an online game at the start of a match in the online game, in accordance with one or more implementations.
Figure 3:
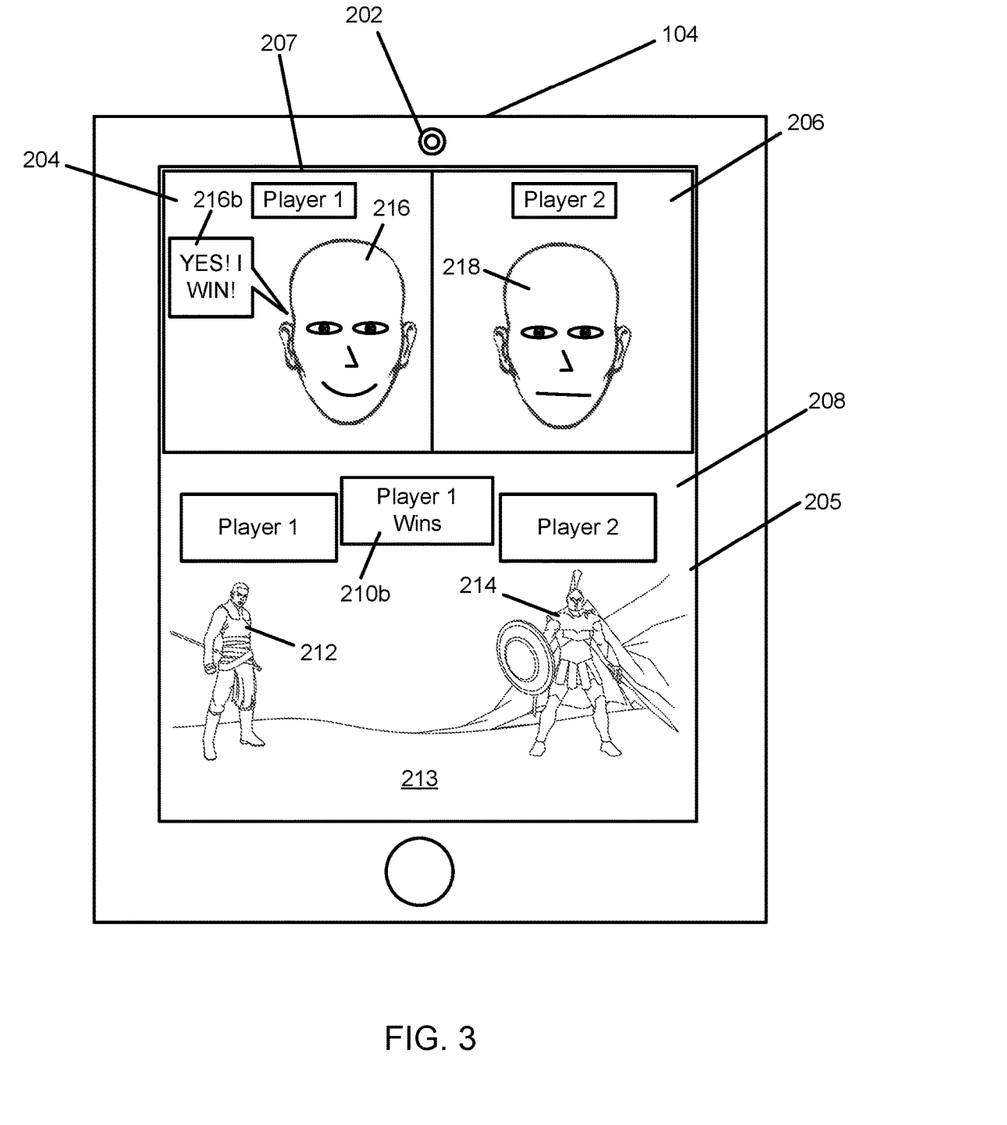
FIG. 3 illustrates the client computing device playing the online game at the end of a match in the online game, in accordance with one or more implementations.

By way of non-limiting illustration, FIG. 2 illustrates a client computing device 104 playing an online game. Client computing device 104 may carry a camera 202, and/or other devices. Camera 202 may be an image sensor. Camera 202 may be configured to generate output signals conveying visual information within a field of view of camera 202. In some implementations, the visual information may define visual content. The visual content may include visuals of a face of a first user 216. First user 216 may be a user of client computing platform 104. The online game may be presented through a client interface 205. The online game may include one or more game elements 208, a communication interface 207, and/or other components. Game element(s) 208 may include one or more game environments 213, one or more game entities, and/or other contents. The one or more game entities may include a first game entity 212, a second game entity 214, and/or other game entities. In some implementations, game element(s) 208 may include messages indicating the state of the game. The messages indicating the state of the game may include a first message 210a, a second message 210b (as illustrated in FIG. 3), and/or other messages. Communication interface 207 may include a first view 204 of the face of first user 216, a second view 206 of a face of a second user 218, and/or other views of other information.

In some implementations, first user 216 may request video edits from client computing device 104. In some implementations, client computing device 104 may obtain the video edits from a system similar to system 100. In some implementations, client computing device 104 may generate video edits by executing one or more computer program components of client computing device 104. The one or more computer program components of client computing device 104 may be similar to the computer program components of system 100. The one or more computer program components of client computing device 104 may include one or more of a capture component, an identification component, a determination component, a generation component, a presentation component, and/or other components.

In some implementations, the capture component may record gameplay of the online game. The recording of the gameplay of the online game may include a view of client interface 205. The recording of the gameplay of the online game may include the view of client interface 205 at the start of the online game (as illustrated in FIG. 2) to the end of the online game (as illustrated in FIG. 3). In some implementations, the capture component may be similar to capture component 106 (as illustrated in FIG. 1).

In some implementations, the identification component may make identifications of user emotional manifestations, events of interest, and/or other information from the online game from the recording of the gameplay of the online game. The identification component may make identifications of the user emotional manifestations, the events of interest, and/or other information from the recording of client interface 205. For example, the identification component may identify the user emotional manifestations from the face of the first user 216 and/or the face of the second user 218. In some implementations, the identification component may identify a first user emotional manifestation from audio signal 216*a* from first user 216, a second user emotional manifestation from audio signal 216*b* from first user 216, and/or other user emotional manifestations. In some implementations, the identification component may identify the events of interest from game element(s) 208, and/or other information. The identification component may identify a first event of interest from message 210*a*, and a second event of interest from message 210*b*, and/or other events of interest. The identification component may be similar to identification component 108 (as illustrated in FIG. 1).

In some implementations, the determination component may determine a portion of the recording of the gameplay of the online game to include in one or more video clips of the video edits, and/or generate the one or more video clips of the video edits. The determination component may be similar to determination component 110 (as illustrated in FIG. 1).

Figure 4:
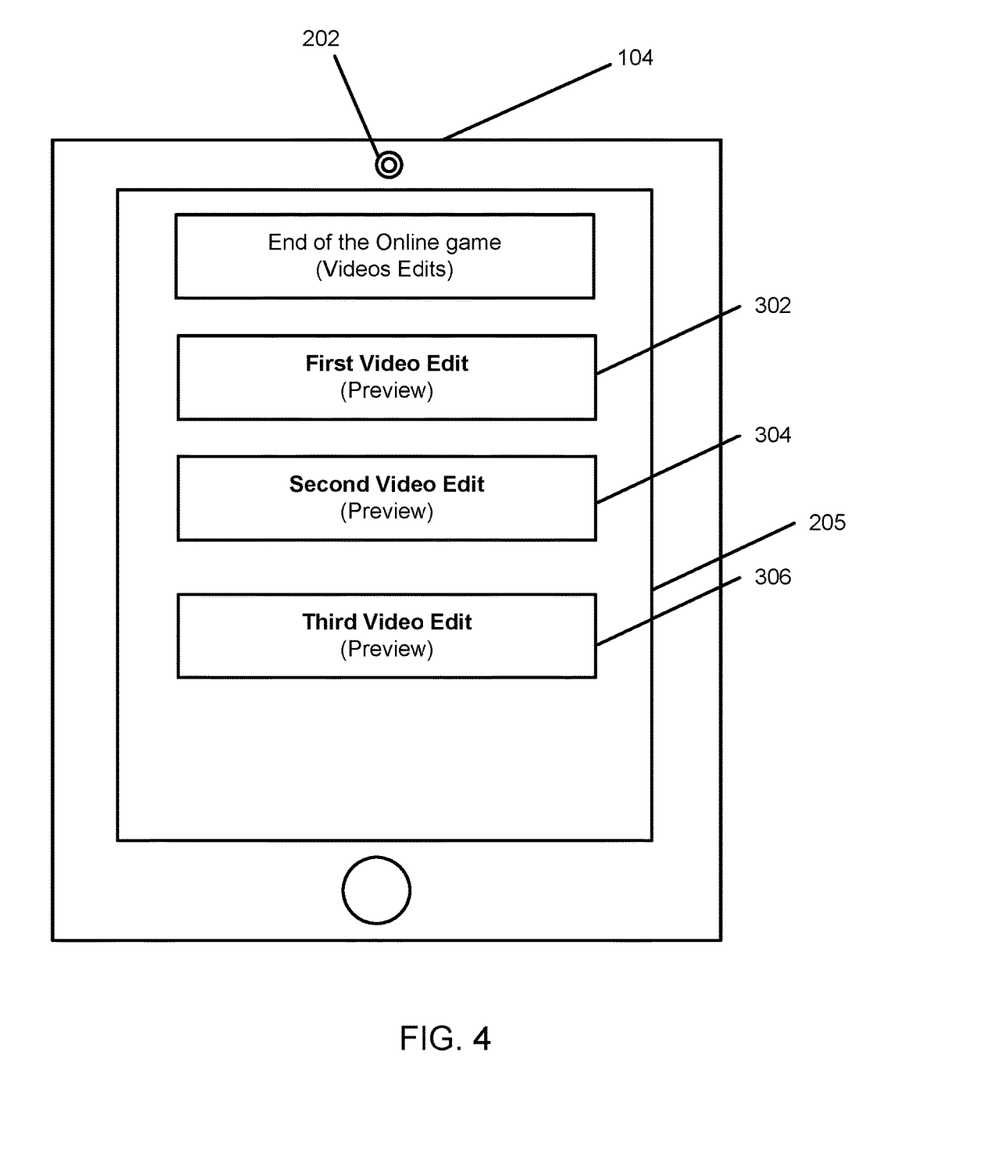
FIG. 4 illustrates the client computing device presented with video edits.

In some implementations, the generation component may be configured to generate one or more video edits and/or generate other content. The one or more video edits may include a first video edit 302, a second video edit 304, a third video edit 306 (as illustrated in FIG. 4), and/or other video edits. The generation component may be similar to generation component 112 (as illustrated in FIG. 1).

In some implementations, the presentation component may be configured to present the video edits and/or other information. The presentation of the video edits to client computing device 104 can be seen in an example illustrated in FIG. 4. In some implementations, the presentation component may present one or more video edits, including first video edit 302, second video edit 304, third video edit 306, to the first user 216 through client computing device 104.

The presentation component may be similar to presentation component 114 (as illustrated in FIG. 1).

Figure 5:
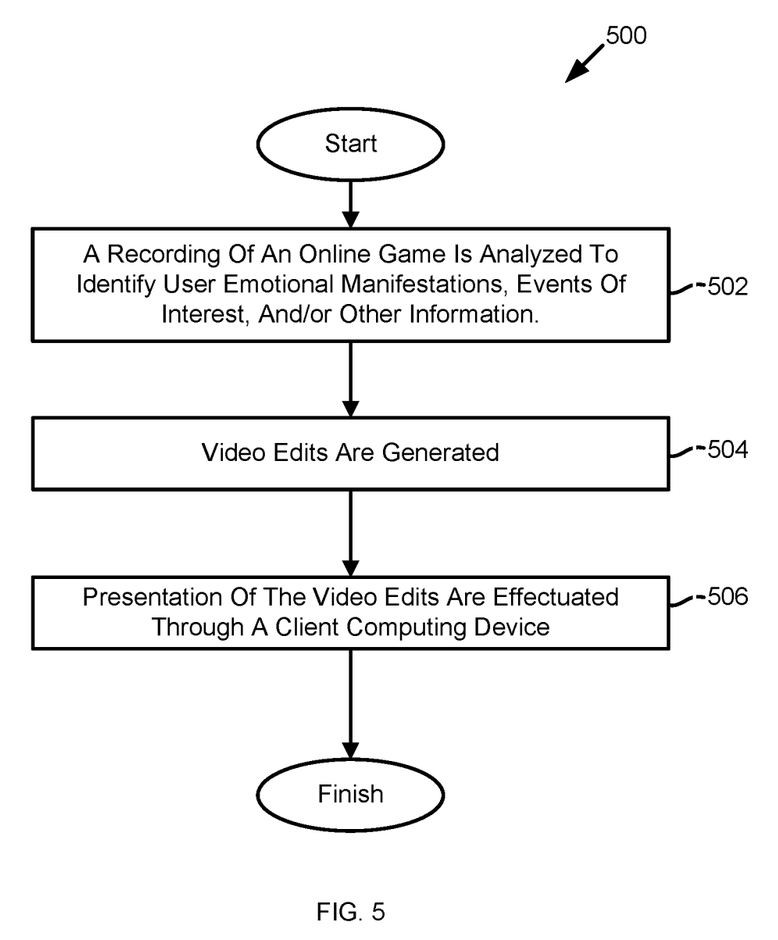
FIG. 5 illustrates a method for generating video edits, in accordance with one or more implementations.

FIG. 5 illustrates a method 500 for generating video edits, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

In some implementations, the method 500 includes operations for generating video edits. The video edits may be highlight videos of gameplay of an online game. The video edits may comprise of one or more video clips of a recording of the online game. A video clip may include a portion of a recording of the gameplay of the online game. The portion of the recording of the online game selected for the video clip may be determined based on user emotional manifestations, events of interest, and/or other information. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

At an operation 502, the recording of the online game is analyzed to identify the user emotional manifestations, the events of interest, and/or other information. The user emotional manifestations may be associated with the user participating in the online game. The events of interest may be associated with in-game events of the online game. In some implementations, the recording of the online game is analyzed to determine when the user emotional manifestations and/or events of interest occurred. In some embodiments, operation 502 is performed by an identification component the same as or similar to identification component 108 (shown in FIG. 1 and described herein).

At an operation 504, video edits are generated. The video edits include selected user emotional manifestations and/or events of interest. The video edits including a first video edit. The first video edit comprises a first video clip, and/or other video clips. The first video clip may include a portion of the recording of the online game that includes at least one user emotional manifestations and/or events of interest. The first video clip may include a portion of the recording of the online game that includes a first point in time of the recording of the online game that includes at least one of the user emotional manifestations and/or events of interest. The first video clip may be generated by a determination component the same as or similar to determination component 110 (shown in FIG. 1 and described herein). In some embodiments, operation 506 is performed by a generation component the same as or similar to generation component 12 (shown in FIG. 1 and described herein).

At an operation 506, presentation of the video edits are effectuated through a client computing device. The video edits are effectuated such that the user can preview the video edits through the client computing device. In some embodiments, operation 508 is performed by a presentation component the same as or similar to presentation component 114 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system for generating highlight reels of gameplay of an online game, the system comprising:

non-transitory storage media configured to store a recording of the online game, the recording of the online game includes audio and/or visual content of an online game environment of the online game and/or of a user participating in the online game;

one or more physical processors configured by machine-readable instructions to:

analyze the recording of the online game to identify one or more user emotional manifestations associated with the user participating in the online game, wherein the one or more user emotional manifestations are visual and/or auditory evidence of one or more emotions being experienced by the user during gameplay of the online game, wherein the one or more user emotional manifestations include a first user emotional manifestation that occurs at a first point in time during the gameplay;

select one or more of the one or more user emotional manifestations that have been identified, wherein the one or more user emotional manifestations occurred at one or more particular points in time;

determine associations between moments of the gameplay of the online game and the one or more user emotional manifestations, wherein the determination determines whether one or more of the moments of the gameplay triggered the first user emotional manifestation;

generate video edits to include the one or more user emotional manifestations that have been selected, and content of the online game environment at the one or more particular points in time of the one or more user emotional manifestations, wherein the video edits including a first video edit and a second video edit, wherein the first video edit includes the first user emotional manifestation and a first video clip of the recording of the online game that includes the first point in time during the gameplay of the online game, and wherein the second video edit includes a second video clip of the recording of the online game that includes a different point in time than the first point in time; and effectuate presentation of the video edits, including the first video edit and the second video edit, through a client computing device such that the user can preview the video edits.

2. The system of claim 1, wherein the one or more physical processors are further configured such that analyzing the recording of the online game identifies events of interest in the online game environment, wherein the events of interest are associated with the gameplay of the online game, wherein the events of interest include a first event of interest that occurs at a second point in time during the gameplay, wherein determining the associations includes a first association between a first event of interest and the first emotional manifestation, and wherein the second video clip of the recording of the online game includes the second point in time.

3. The system of claim 2, wherein the events of interest include a second event of interest at a fourth point in time, the second point in time and the fourth point in time are different points in time.

4. The system of claim 1, wherein the user emotional manifestations include a second user emotional manifestation at a third point in time, the first point in time and the third point in time are different points in time.

5. The system of claim 1, wherein the evidence of one or more emotions being experienced by the user during gameplay of the online game may include the user's reaction to the gameplay of the online game, the user's reaction to the gameplay of the online game may include one or more of a vocal communication from the user, a physical communication from the user, and/or a combination of the vocal and physical communication from the user.

6. The system of claim 5, wherein the vocal communication may include one or more spoken words, tonality, speed, volume, and/or other vocal communication.

7. The system of claim 5, wherein the physical communication may include one or more gestures made by the user.

8. The system of claim 1, wherein the online game includes audio and/or visual content of the user participating in the online game, including a real-time or near real-time video of the user participating in the online game.

9. The system of claim 1, wherein the in-game events being actions, activities, events, and/or other occurrences in the online game.

10. The system of claim 9, wherein the occurrences in the online game includes one or more changes in game state, criteria being met, temporal occurrences, interactions within the online game, and/or other occurrences in the online game.

11. A method for generating highlight reels of gameplay of an online game, the method comprising:

analyzing a recording of the online game, the recording of the online game includes audio and/or visual content of an online game environment of the online game and of a user participating in the online game;

identifying one or more user emotional manifestations associated with the user participating in the online game, wherein the one or more user emotional manifestations are visual and/or auditory evidence of one or more emotions being experienced by the user during gameplay of the online game, wherein the one or more user emotional manifestations include a first user emotional manifestation that occurs at a first point in time during the gameplay;

selecting one or more of the one or more user emotional manifestations that have been identified, wherein the one or more user emotional manifestations occurred at one or more particular points in time;

determining associations between moments of the gameplay of the online game and the one or more user emotional manifestations, wherein the determination determines whether one or more of the moments of the gameplay triggered the first user emotional manifestation;

generating video edits to include the one or more user emotional manifestations that have been selected, and content of the online game environment at the one or more particular points in time of the one or more user emotional manifestations, wherein the video edits including a first video edit and a second video edit, wherein the first video edit includes the first user emotional manifestation and a first video clip of the recording of the online game that includes the first point in time during the gameplay of the online game, and wherein the second video edit includes a second video clip of the recording of the online game that includes a different point in time than the first point in time; and effectuating presentation of the video edits, including the first video edit and the second video edit, through a client computing device such that the user can preview the video edits.

12. The method of claim 11, further comprising:

identifying events of interest in the online game environment, wherein the events of interest are associated with the gameplay of the online game, wherein the events of interest include a first event of interest that occurs at a second point in time during the gameplay, wherein determining the associations includes determining a first association between a first event of interest and the first emotional manifestation, and wherein the second video clip of the recording of the online game includes the second point in time.

13. The method of claim 12, wherein the events of interest include a second event of interest at a fourth point in time, the second point in time and the fourth point in time are different points in time.

14. The method of claim 11, wherein the user emotional manifestations include a second user emotional manifestation at a third point in time, the first point in time and the third point in time are different points in time.

15. The method of claim 11, wherein the evidence of one or more emotions being experienced by the user during gameplay of the online game may include the user's reaction to the gameplay of the online game, the user's reaction to the gameplay of the online game may include one or more of a vocal communication from the user, a physical communication from the user, and/or a combination of the vocal and physical communication from the user.

16. The method of claim 15, wherein the vocal communication may include one or more spoken words, tonality, speed, volume, and/or other vocal communication.

17. The method of claim 15, wherein the physical communication may include one or more gestures made by the user.

18. The method of claim 11, wherein the online game includes audio and/or visual content of the user participating in the online game, including a real-time or near real-time video of the user participating in the online game.

19. The method of claim 11, wherein the in-game events being actions, activities, events, and/or other occurrences in the online game.

20. The method of claim 19, wherein the occurrences in the online game includes one or more changes in game state, criteria being met, temporal occurrences, interactions within the online game, and/or other occurrences in the online game.

* * * * *